March 27, 1934. E. J. SCHARIO Re. 19,121

SHIELD FOR PILING BRICKS

Original Filed July 26, 1930 2 Sheets-Sheet I

Inventor

E. J. Schario

By Frease and Bishop

Attorneys

March 27, 1934. E. J. SCHARIO Re. 19,121

SHIELD FOR PILING BRICKS

Original Filed July 26, 1930 2 Sheets-Sheet 2

Inventor

E. J. Schario

By Frease and Bishop

Attorneys

Reissued Mar. 27, 1934

Re. 19,121

UNITED STATES PATENT OFFICE 19,121

SHIELD FOR PILING BRICKS

Edwin J. Scharlo, Canton, Ohio

Original No. 1,814,968, dated July 14, 1931, Serial No. 471,068, July 26, 1930. Application for reissue April 10, 1933, Serial No. 665,464

8 Claims. (Cl. 206—46)

Figure 1:
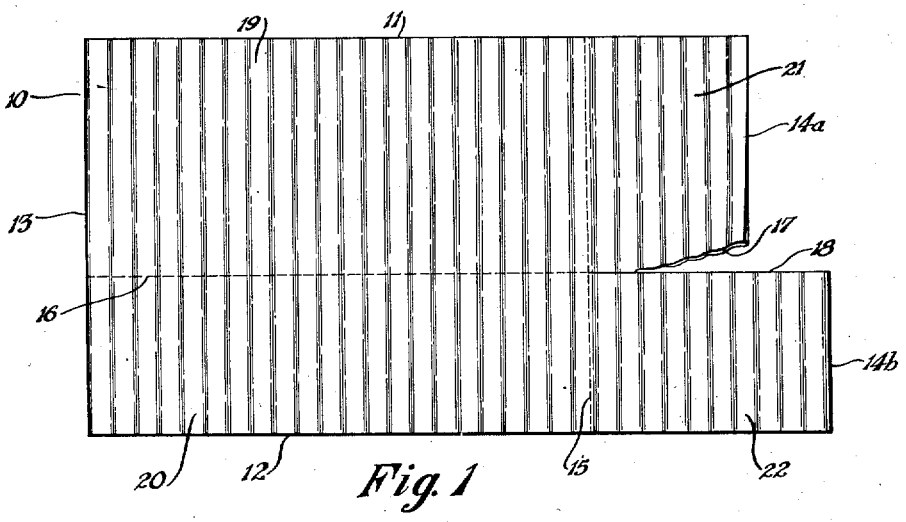

The invention relates to piling, transporting, packing, and shipping bricks and the like.

More particularly, the invention relates to protective means for the abutting surfaces of a plurality of bricks in a pile, particularly bricks and the like of the glazed variety, whereby the bricks may be piled closely together in horizontal rows and vertical tiers, and transferred from place to place with a minimum of injury to the surfaces and edges thereof.

In the manufacture and shipment of glazed bricks, it is common practice to transport the bricks from the kiln to the warehouse, where they are piled for storage, and from the warehouse to the freight car, without using any protective means between the individual bricks, or even between the tiers of bricks. The bricks are usually packed in the freight car by placing a layer of straw between each tier and the adjacent tier above it, and by inserting a layer of straw between the sides of the car and the bricks.

This method, while relatively inexpensive, has been found very unsatisfactory, for the reason that only part of the abutting surfaces of the bricks are protected, and the lurching and jarring of the car in transit causes the straw between the bricks and the car sides to become compressed. This permits the whole pile or tiers thereof to slide and shift position in the car, and since only two or at most four sides of each brick are protected, marring of the glazed surfaces and chipping of a large proportion of the edges of the car load of bricks results. Various methods of piling the bricks in the cars have been experimented with in order to reduce the damage incurred, including the placing of stretcher courses in every other tier of bricks, but all of these methods have proven unsatisfactory.

Sheet paper has been used to some extent, but in such case all surfaces of the bricks are not protected and practically the same disadvantages are present as in using straw; and when straw or sheet paper is used, it is used only in the freight car and no protection is provided while conveying the bricks from the kiln to the warehouse, piling them in the warehouse, and transporting them from the warehouse to the car. This is because it would involve a considerable loss of time to transport the straw with the bricks and replace it when the bricks are repiled for storage or shipment. For the same reasons, when the bricks are taken from the freight car via truck to the building site, the straw is left in the car. Thus the brick surfaces are not protected against marring and chipping due to bumping and jarring of the load during transportation except while the bricks are in the freight car, and then only partially protected. Damage also often results from the excessive weight on the lower tiers of bricks in storage piles where the height of the piles is necessarily relatively great in order to conserve space.

During some of the successive steps of transporting bricks from kiln to scaffold the bricks are subjected to handling by brick tongs, which increases the likelihood of damaging the surfaces by chipping and abrasion.

The physical characteristics of bricks, particularly bricks of the glazed variety, require that the bricks be carefully handled at all times to avoid damage to their surfaces, and it is obvious that a great amount of injury is done to the unprotected surfaces of such bricks in the handling of the same during the various steps of transporting them from kiln to storage, storage to freight car, freight car to truck, truck to building site, and building site to scaffold; due to the fact that the only time the bricks have any protection is when they are in the freight car, and then only part of the surfaces are protected.

It has been proposed to provide 6 sided individual containers for each brick, but this involves relatively great expense, and such a container is cumbersome and requires a great loss of time in individually packing the bricks at the plant, and unpacking them at the building site.

Another proposed form of individual container is a 4 sided box or tube, but such a tube does not protect all surfaces of the brick when piled and does not permit inspection thereof without removal of the tube, and here again the attendant disadvantages of loss of time and excessive cost are involved.

Various packing strips have been devised which are laid between adjacent rows of bricks, but obviously these do not protect all surfaces of each brick.

It is an object of the present invention to provide shields for the bricks which are easily and quickly applied as the bricks come from the kiln, which permit inspection of the facing surfaces of the bricks, and which will remain on the bricks while the latter are transported from the kiln to the scaffold where they are quickly removed without any material loss of time.

Another object is to provide shields for the bricks which are relatively inexpensive, and which, when the bricks are piled or packed, will protect substantially all surfaces of each brick.

A further object is to provide shields for the bricks when piling which will further protect the surfaces thereof from material damage incident to handling as by brick tongs.

These and ancillary objects are attained by the parts, methods, improvements and combinations which comprise the present invention and which are particularly and distinctly pointed out and set forth in the appended claims forming part hereof.

In general terms the invention comprises 3 sided shields for the bricks which when the bricks are piled or packed will protect substantially all surfaces of each brick, and which are easily and quickly applied and removed.

Figure 2:
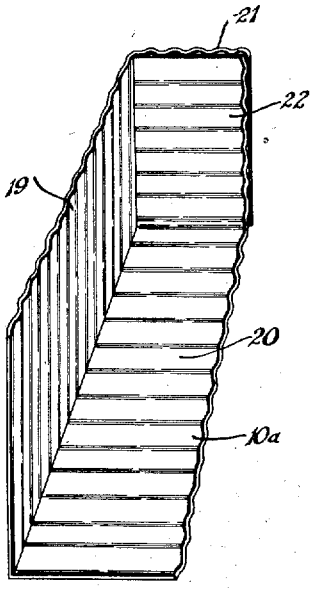
Figure 3:
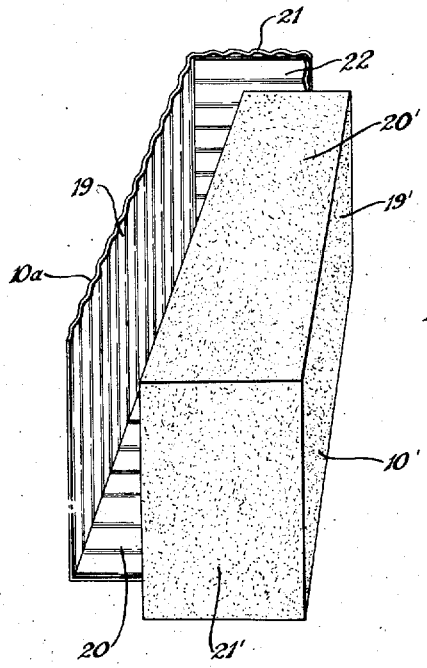
Figure 4:
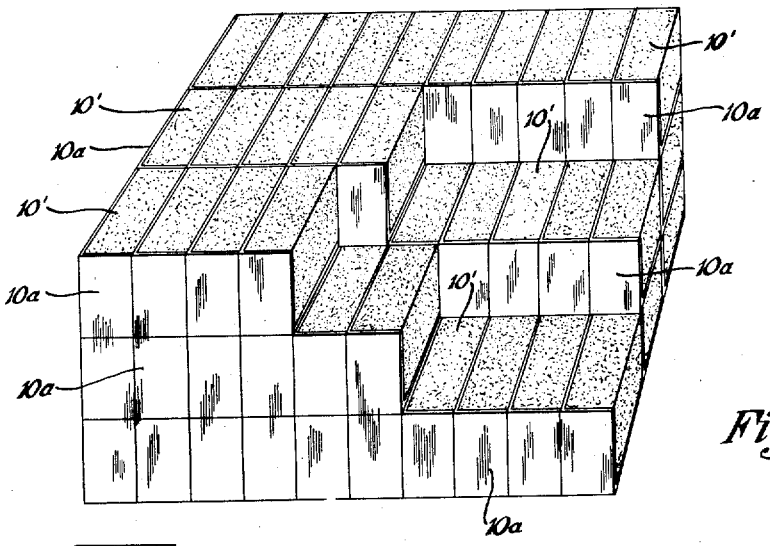
Figure 5:
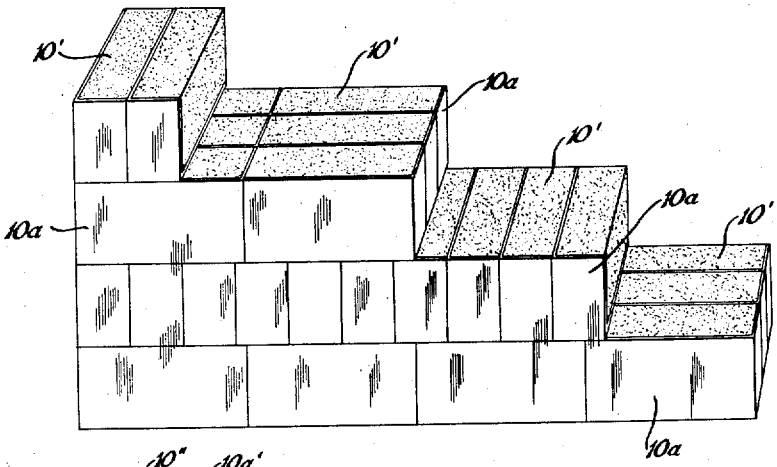
Figure 6:
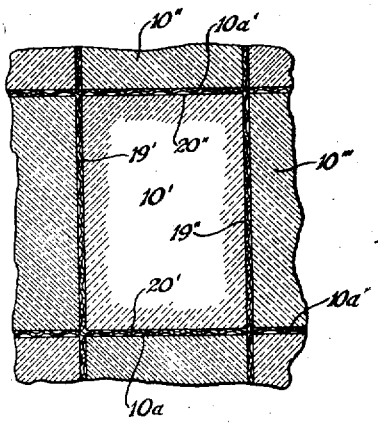

A preferred embodiment of the present improvement is illustrated in the accompanying drawings forming part hereof in which Fig. 1 is a perspective view of a blank from which the shield is formed, the dotted lines indicating the manner of folding;

Fig. 2, a perspective view of the improved shield;

Fig. 3, a perspective view of the improved shield similar to Fig. 2, showing the manner of placing a brick therein;

Fig. 4, a perspective view of a portion of a pile of bricks with the shields in place, showing the method of piling in a freight car or for transporting from place to place;

Fig. 5, a perspective view of a portion of a pile of bricks with the shields in place, showing the method of piling for storage and trucking; and Fig. 6, a cross sectional view of a brick and adjacent bricks thereto in the interior of a pile such as shown in Fig. 4, illustrating how all of the surfaces of each brick may be protected.

Similar numerals refer to similar parts throughout the several views.

The blank indicated generally at 10 in Fig. 1, from which the improved shield is formed, is preferably cut from plain, indented or corrugated fibrous material, such as paper. The blank 10 has the side edges 11 and 12, and end edges 13 and 14*a* and 14*b* and is creased for folding along dotted lines 15 and 16 at right angles to each other. The blank is slit longitudinally from the edge 14*a* to the folding line 15 along the folding line 16 extended, to form the interior edges 17 and 18.

The portion 19 of the blank 10 defined by the edges 11 and 13 and folding lines 15 and 16, is preferably substantially the size and shape of the top or bottom 19′ of the brick 10′ shown in Fig. 3; the portion 20, defined by edges 12 and 13, and folding lines 15 and 16, is preferably substantially the size and shape of the front or back face 20′ of the brick 10′; and the portions 21 and 22 defined respectively by edges 11, 14*a*, 17 and line 15 and by edges 12, 14*b*, 18 and line 15, are each preferably substantially the size and shape of an end 21′ of the brick 10′.

When the blank 10 is folded along lines 15 and 16 to form the three sided shield 10*a* as shown in Figs. 2 and 3, the portions 21 and 22 are preferably secured together by any well known means to maintain the shield in its proper form, three adjoining sides extending from a common corner, and having an open top and an open face. As shown in Fig. 3, a brick 10′ may be quickly and easily inserted in the shield 10*a*, the three sides of the shield 19, 20, and 21—22 forming a protective covering or cushion for three sides of the brick, namely, the top or bottom, front or back, and one end respectively; that is to say, three adjoining faces of the brick extending from a common corner thereof.

Preferably, the blank 10 is cut and creased to such dimensions that, when folded and the portions 21 and 22 secured together, the length and width of each adjoining side is determined by the lengths of the adjoining edges of the other two sides. For example, the length of side 19 is determined by the adjoining edge of side 20 corresponding to crease line 16, and the width of side 19 is determined by the adjoining edge 18 of side 22. Thus each adjoining side of the shield 10 is adapted to cover the corresponding surface of a brick.

When each of a group of the bricks 10′ are encased in one of the improved shields 10*a* and piles as shown in Fig. 4, with the shield for each brick occupying a position corresponding to the position of the shield for each adjacent brick, it will be seen that all abutting surfaces of each brick are protected, the shields abutting each brick providing a protective covering for and coextensive with the three sides not covered by its own shield.

In Fig. 6, is shown a fragmentary cross sectional view through the interior of a pile of bricks encased in shields such as shown in Fig. 4. The brick 10′ has its surfaces 19′ and 20′ protectively covered by its shield 10*a*, its surface 20″ protectively covered by the shield 10*a*′ of the brick 10″, and its surface 19″ protectively covered by the shields 10*a*″ of the brick 10‴. In the same way one of the ends of the brick 10′ is protectively covered by its shield 10*a* and the other end is protectively covered by the end of the shield abutting it.

The bricks are each preferably encased in an individual shield as they are taken from the kiln, and piled in a manner similar to that shown in Fig. 4 on transporting vehicles such as barrows or trucks, whence they are conveyed to the warehouse.

At the warehouse they are preferably piled in the manner shown in Fig. 5 with the bricks of each alternate tier extending longitudinally at right angles to the direction of longitudinal extension of the bricks of the tiers immediately adjacent thereto. The latter method of piling is preferable in piling bricks for storage in order to insure keeping the pile intact when the bricks are piled to a relatively great height to conserve storage space. The use of the improved shield in this method of piling prevents damage to the abutting faces and edges resulting from the excessive weight due to the height of the pile. When bricks are to be shipped they are transported from the storage pile to the freight car where they may be piled in the manner shown in Fig. 4, since the use of the improved shield prevents movement of the bricks while in the car, and more complicated methods of piling are consequently unnecessary.

When the bricks are removed from the car prior to being transported to the building site, brick tongs are sometimes used in transferring them from the car to the truck, and in such case the shield will still be held in place between each pair of bricks in a series gripped by the tongs.

The bricks are then removed from the trucks and piled at the building site, from whence they may be transferred to the scaffold to be laid up by the mason.

It will be apparent from the foregoing description, that since the bricks are handled individually or in groups the individual shields will be maintained in their proper positions throughout all of the successive steps of transportation from the kiln to the scaffold, where each brick may be easily lifted out of its shield by the mason, and all that is necessary in transferring the bricks from one pile to another, is to pile the bricks so that all of the shields occupy corresponding positions. As it is customary to pile bricks systematically, it is obvious that no loss of time results in the use of applicant's improved shield, and this fact together with the substantial elimination of chipping and marring of the bricks has been proven in actual practice.

I claim:

1. A pile or pack of bricks and the like, and protective means for the abutting surfaces of all the bricks including a shield for each brick protecting three adjoining surfaces extending from a common corner of the brick.

2. A pile or pack of bricks and the like, and protective means for the abutting surfaces of all of the bricks including a shield of corrugated fibrous material for each brick protecting three adjoining surfaces extending from a common corner of the brick.

3. A pile of bricks and the like, and protective means for the abutting surfaces of all the bricks including a shield for each brick protecting three adjoining surfaces thereof and protecting one exposed abutting surface of each of three other bricks.

4. The method of piling bricks and the like closely together in horizontal rows and vertical tiers and protecting the abutting surfaces of all of the bricks, which consists in interposing between the abutting surfaces of the several bricks, shielding means protecting three adjoining surfaces of one brick and one exposed abutting surface of each of three other bricks.

5. In a pile of bricks and the like, protective means for the bricks including a plurality of shields, each shield protecting three adjoining surfaces of one brick, and protecting an adjacent surface of each of three opposing bricks.

6. The method of piling bricks and the like closely together in horizontal rows and vertical tiers and protecting opposing surfaces of the bricks, which consists in interposing between the opposing surfaces, shielding means protecting three adjoining surfaces of one brick and an adjacent surface of each of three opposing bricks.

7. In a pile of bricks and the like, protective means for the bricks including a plurality of shields, each shield protecting three adjoining surfaces of one brick and protecting an adjacent surface of each of a plurality of opposing bricks.

8. The method of piling bricks and the like closely together in horizontal rows and vertical tiers, and protecting opposing surfaces of the bricks, which consists in interposing between the opposing surfaces shielding means protecting three adjoining surfaces of one brick and an adjacent surface of each of a plurality of opposing bricks.

EDWIN J. SCHARIO.